(12) United States Patent
Yamaguchi et al.

(10) Patent No.: US 6,381,815 B1
(45) Date of Patent: May 7, 2002

(54) BUCKLE WITH NON-CONTACT SWITCH

(75) Inventors: Yutaka Yamaguchi; Akihiro Shiota; Yoshihiko Kawai; Tadayuki Asako; Takaaki Kimura, all of Tokyo; Hirofumi Koizumi, Kashiwara, all of (JP)

(73) Assignees: Takata Corporation, Tokyo (JP); Hosiden Corporation, Yao (JP)

( * ) Notice: Subject to any disclaimer, the term of this patent is extended or adjusted under 35 U.S.C. 154(b) by 0 days.

(21) Appl. No.: 09/662,027

(22) Filed: Sep. 14, 2000

(30) Foreign Application Priority Data

Sep. 21, 1999 (JP) ............................................. 11-267257
Dec. 27, 1999 (JP) ............................................. 11-369658

(51) Int. Cl.⁷ .......................... A44B 11/00; B60R 22/00
(52) U.S. Cl. .......................................... 24/633; 24/641
(58) Field of Search ............................. 24/633, 636, 637, 24/640, 641; 180/268, 270, 801.1

(56) References Cited

U.S. PATENT DOCUMENTS

| | | | | |
|---|---|---|---|---|
| 3,766,612 A | * | 10/1973 | Hattori | 24/650 X |
| 5,274,890 A | * | 1/1994 | Shimizu et al. | 24/633 X |
| 5,406,252 A | * | 4/1995 | Dear | 340/457.1 |
| 5,752,299 A | * | 5/1998 | Vivacqua et al. | 24/633 |
| 5,839,174 A | * | 11/1998 | Chamings et al. | 24/633 |
| 5,915,286 A | * | 6/1999 | Figi et al. | 633/865.9 |
| 5,960,523 A | * | 10/1999 | Husby et al. | 73/633 |
| 5,966,784 A | * | 10/1999 | Arbogast et al. | 24/633 |
| 6,079,744 A | * | 6/2000 | Husby et al. | 24/633 X |
| 6,082,481 A | * | 7/2000 | Engler | 24/633 X |
| 6,233,794 B1 | * | 5/2001 | Kohlndorfer et al. | 24/641 |

FOREIGN PATENT DOCUMENTS

| | | |
|---|---|---|
| DE | 43 08 038 | 9/1994 |
| DE | 197 15 133 | 10/1998 |
| DE | 198 12 675 | 8/1999 |

* cited by examiner

*Primary Examiner*—Anthony Knight
*Assistant Examiner*—Ruth C. Rodriguez
(74) *Attorney, Agent, or Firm*—Kanesaka & Takeuchi

(57) ABSTRACT

A buckle is provided with a non-contact buckle switch improved in durability to be securely operated. The non-contact buckle switch is switched by detecting a movement of one of an ejector, latch member and lock member of the buckle. The buckle switch includes a magnet and a Hall element for generating an electromotive force by a magnetic field of the magnet. One of the magnet and the Hall element is attached to a fixed member, and the other of the magnet and the Hall element is attached to one of the ejector, latch member and lock member.

4 Claims, 7 Drawing Sheets

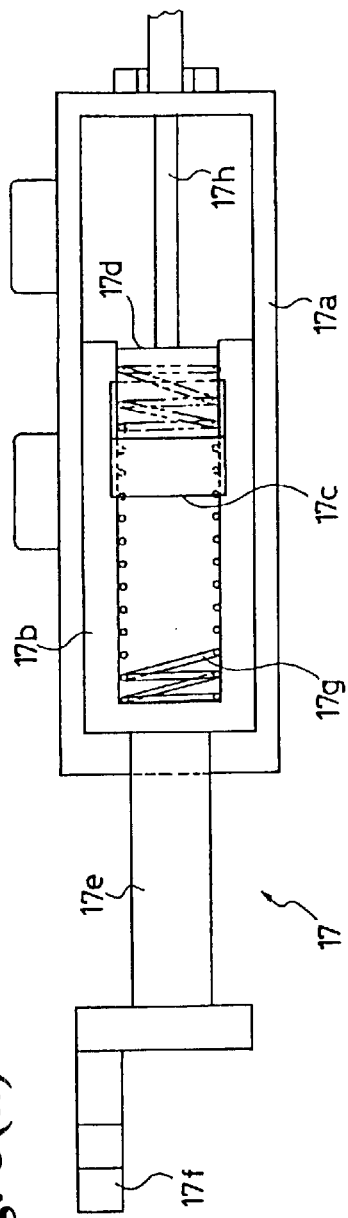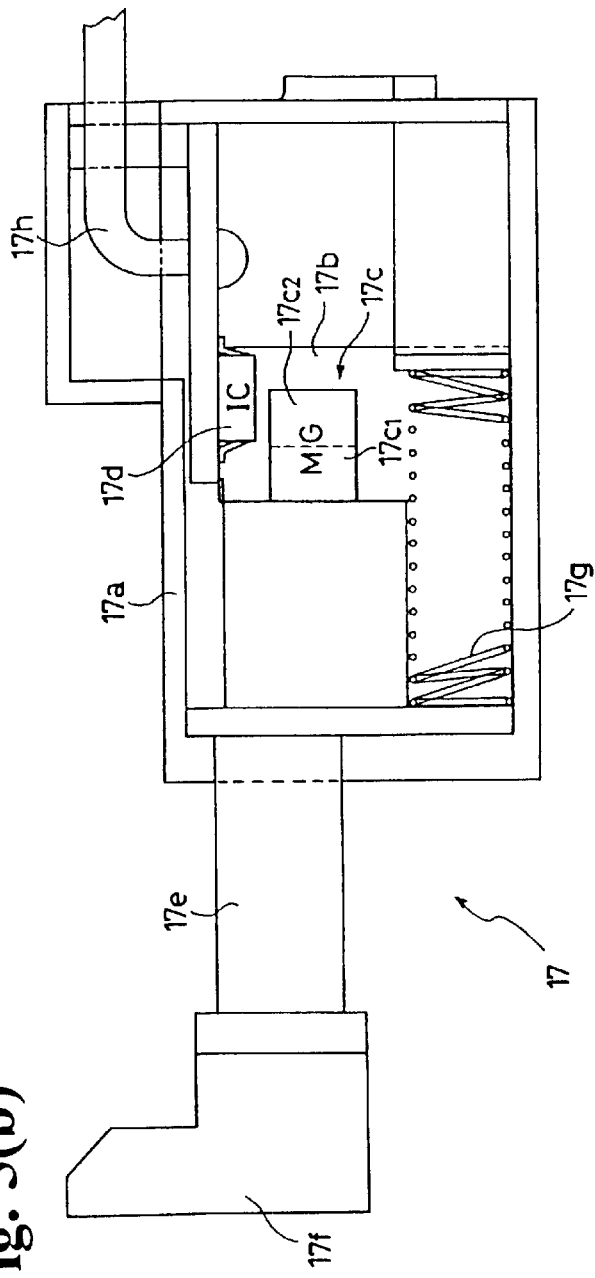
Fig. 5(a)
Fig. 5(b)

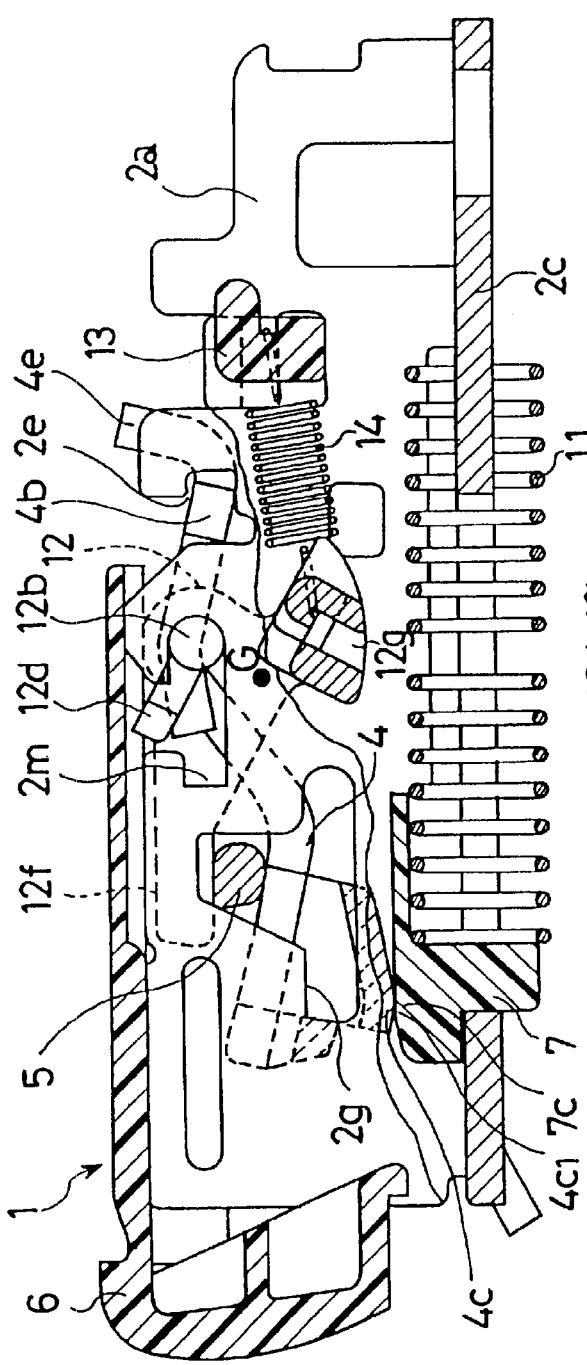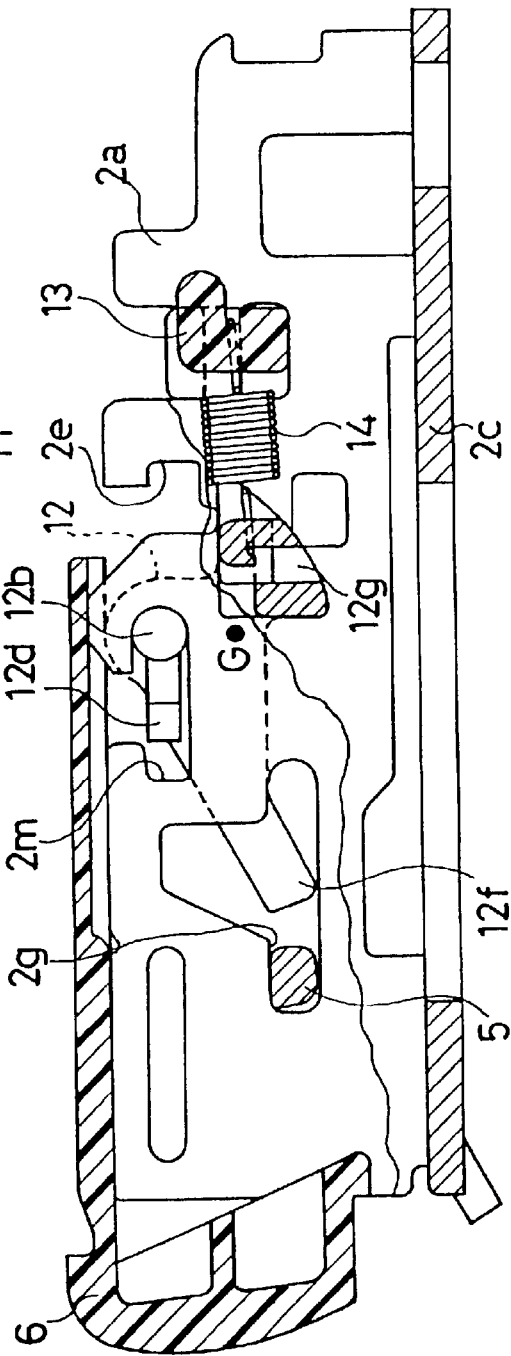
Fig. 7(a)
Fig. 7(b)

BUCKLE WITH NON-CONTACT SWITCH

BACKGROUND OF THE INVENTION AND RELATED ART STATEMENT

The present invention relates to a buckle used in a safety belt device, such as a seat belt device for a seat of an automobile and, more particularly, to a buckle having a buckle switch which is switched by an engagement between a tongue and the buckle.

Currently, in various vehicles including automobiles, seat belt devices for protecting occupants in emergency, such as collision, are installed on seats thereof. In order to facilitate the occupant to wear on and off such a seat belt, a buckle is normally provided. In general, the buckle comprises a latch member which engages a tongue, wherein the latch member is biased by a spring in such a direction as to engage the tongue, and a locking member holding the latch member in the latched state where the tongue is engaged with the buckle.

By the way, the buckle is provided with a buckle switch for detecting the latched state in order to indicate the latched state where the tongue is engaged with the buckle, and to control the operation of other devices of the seat belt device, such as a retractor, and other devices installed in the vehicle, which should be operated depending on the operation of the seat belt device according to the latched state where the tongue is engaged with the buckle.

Conventional buckle switches generally used are contact type switches, such as a substrate type switch and a micro switch. In a buckle switch of this type, however, since switching actions are repeated at contacts of the buckle switch every time the tongue is engaged with and disengaged from the buckle, there is a possibility of contact failure due to abrasion of the contacts. This means that the durability of the buckle switch is not so well.

Thus, a buckle switch employing a switch with a non-contact type was proposed in Japanese Unexamined Patent Publication (KOKAI) H10-155521. The buckle switch of the non-contact type disclosed in this publication comprises a catoptric device having a field supply device and a field effect device, wherein the field supply device emits light to a reflecting surface of a latch member which locks the tongue and the field effect device senses reflected light reflected by the reflecting surface, thereby detecting the latched state or unlatched state of the tongue and the buckle.

Since the buckle switch of the non-contact type has no contact, there is no possibility of contact failure due to abrasion of the contacts. This means that the buckle switch has improved durability.

However, the buckle switch of the non-contact type which employs the catoptric device is easily affected by installation error between the latch member and the catoptric device, liquid, such as water and juice, foreign materials, such as dusts, and rust due to liquid. Therefore, there is a possibility that, in the affected condition, the catoptric device does not easily receive reflected light, so that the buckle switch does not securely operate. It should be noted that the buckle switch of the contact type is also easily affected by liquid, such as water and juice, foreign materials, such as dusts, and rust due to liquid.

The present invention has been made for solving the aforementioned problems, and an object of the present invention is to provide a buckle provided with a buckle switch which has improved durability and still can be securely operated.

SUMMARY OF THE INVENTION

To solve the aforementioned problems, the buckle according to the first aspect of the invention comprises at least, a base having side walls; an ejector which is disposed on the base movably in the longitudinal direction and moves according to an insertion of a tongue, the ejector allowing the tongue to come off the buckle when the engagement between the tongue and the buckle is released; a latch member which is pivotally supported by the side walls so as to pivot between its unlatched position and its latched position, is biased toward the latched position, and when the tongue is inserted into a predetermined position, pivots to its latched position where the tongue is engaged; an operating member for releasing the engagement between the tongue and the latch member which are in a latched state; and a lock member which is disposed between the side walls so as to move between its unlocked position and its locked position, is set in the locked position where the latch member is held in the latched position when the tongue is engaged with the latch member, and is moved to the unlocked position by the operating member where the engagement of the tongue by the latch member can be cancelled. The buckle further includes a buckle switch of a non-contact type which can be switched by detecting a movement of either one of the ejector, the latch member, and the lock member. The buckle switch comprises a magnet and a Hall element generating electromotive force by the magnetic field of the magnet. One of the magnet and the Hall element is attached to a fixed member, and the other of the magnet and the Hall element is attached to either one of the ejector, the latch member, and the lock member.

In the second aspect of the invention, the magnet comprises two magnet members having different directions of magnetic field. One of the two magnet members confronts the Hall element in the unlatched state where the tongue is not engaged with the buckle, and the other one of the two magnet members confronts the Hall element in the latched state where the tongue is engaged with the buckle.

In the third aspect of the invention, the buckle switch comprises a switch casing attached to the base, and a latch detecting movable member which is disposed on the switch casing so as to move following the movement of either one of the latch member and the lock member. One of the magnet and the Hall element is attached to one of the latch detecting movable member and the switch casing, and the other one of the magnet and the Hall element is attached to the other of the latch detecting movable member and the switch casing.

In the fourth aspect of the invention, the buckle switch further comprises biasing means disposed in the switch casinq for biasing the latch detecting movable member toward the outside of the switch casing when the buckle is shifted from the unlatched state to the latched state.

In the buckle of the present invention structured as described above, the buckle switch is switched in a non-contact manner by Hall effect by using the magnet and the Hall element. Therefore, there is no possibility of contact failure due to abrasion of contacts, thus significantly improving the durability as compared to switches of a contact type, such as a substrate type switch and a micro switch.

In addition, as compared to the buckle switch composed of a catoptric device disclosed in the aforementioned publication, the buckle switch of the present invention is not easily affected by installation error, liquid, such as water and juice, foreign materials, such as dusts, and rust due to liquid. The buckle switch of the present invention can be further securely operated.

Particularly, according to the fourth aspect, the biasing means biases the latch detecting movable member to securely slide in the projecting direction when the buckle is shifted from the unlatched state to the latched state, thereby stabilizing and securing the detecting operation of the buckle switch.

BRIEF DESCRIPTION OF THE DRAWINGS

FIGS. 5(a) and 5(b) show a buckle switch used in the buckle shown in FIG. 1, wherein FIG. 5(a) is a plan view and FIG. 5(b) is a front view;

FIGS. 6(a)–6(c) show the state where the buckle switch shown in FIGS. 5(a) and 5(b) is mounted on a base, wherein FIG. 6(a) is a front view showing the buckle switch in the unlatched state in which the tongue is not engaged, FIG. 6(b) is a front view showing the buckle switch in the latched state where the tongue is engaged, and FIG. 6(c) is a side view partially showing the left side in FIG. 6(b); and FIGS. 7(a) and 7(b) are views for explaining the action of the buckle for engaging the tongue, wherein FIG. 7(a) is a view showing the unlatched state in which the tongue is not engaged with the buckle, and FIG. 7(b) is a view showing the latched state in which the tongue is engaged with the buckle.

DETAILED DESCRIPTION OF PREFERRED EMBODIMENTS

Hereinafter, embodiments of the present invention will be described with reference to the attached drawings.

Figure 1:
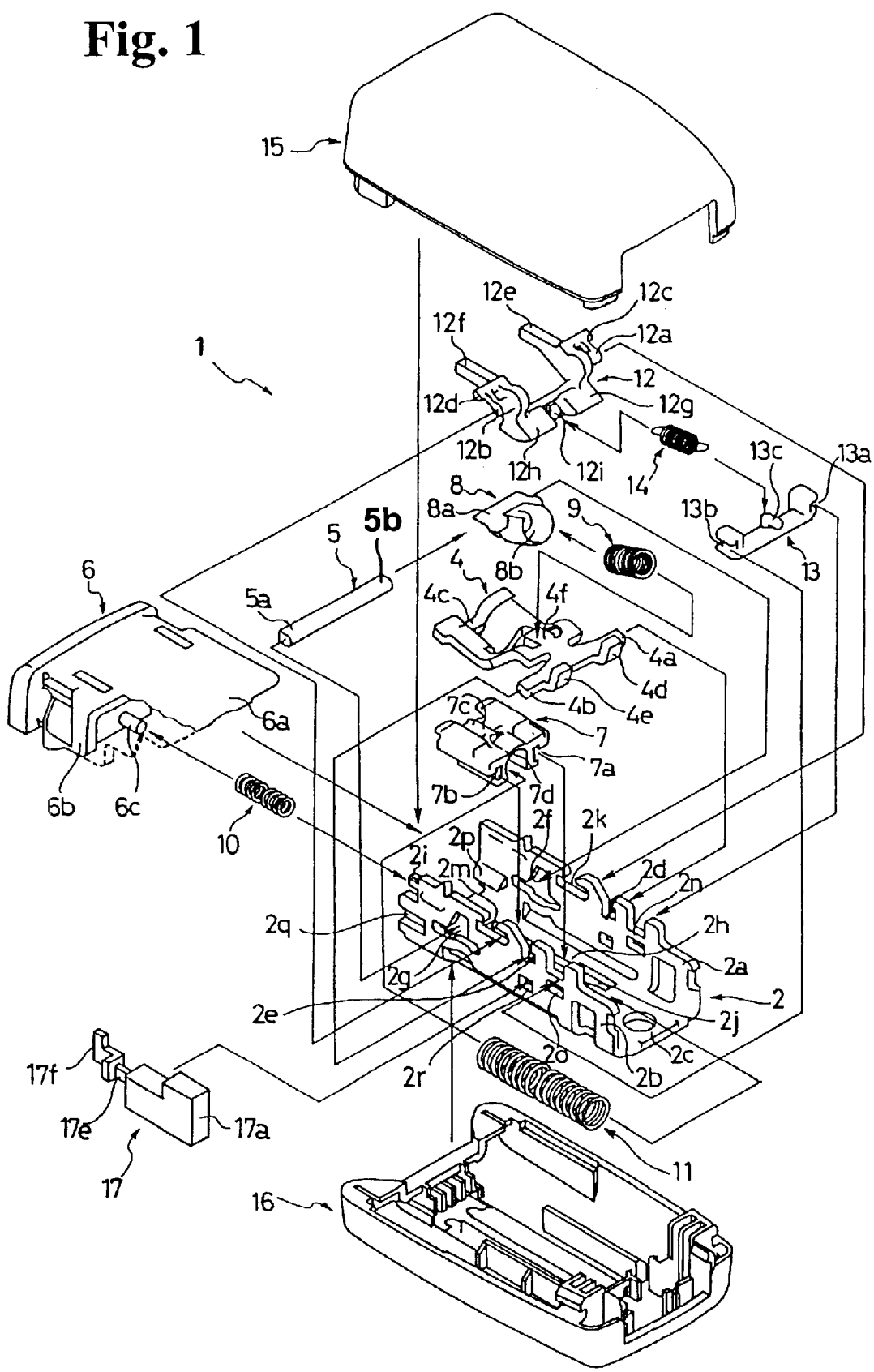
FIG. 1 is an exploded perspective view showing an embodiment of a buckle of the present invention.
Figure 2:
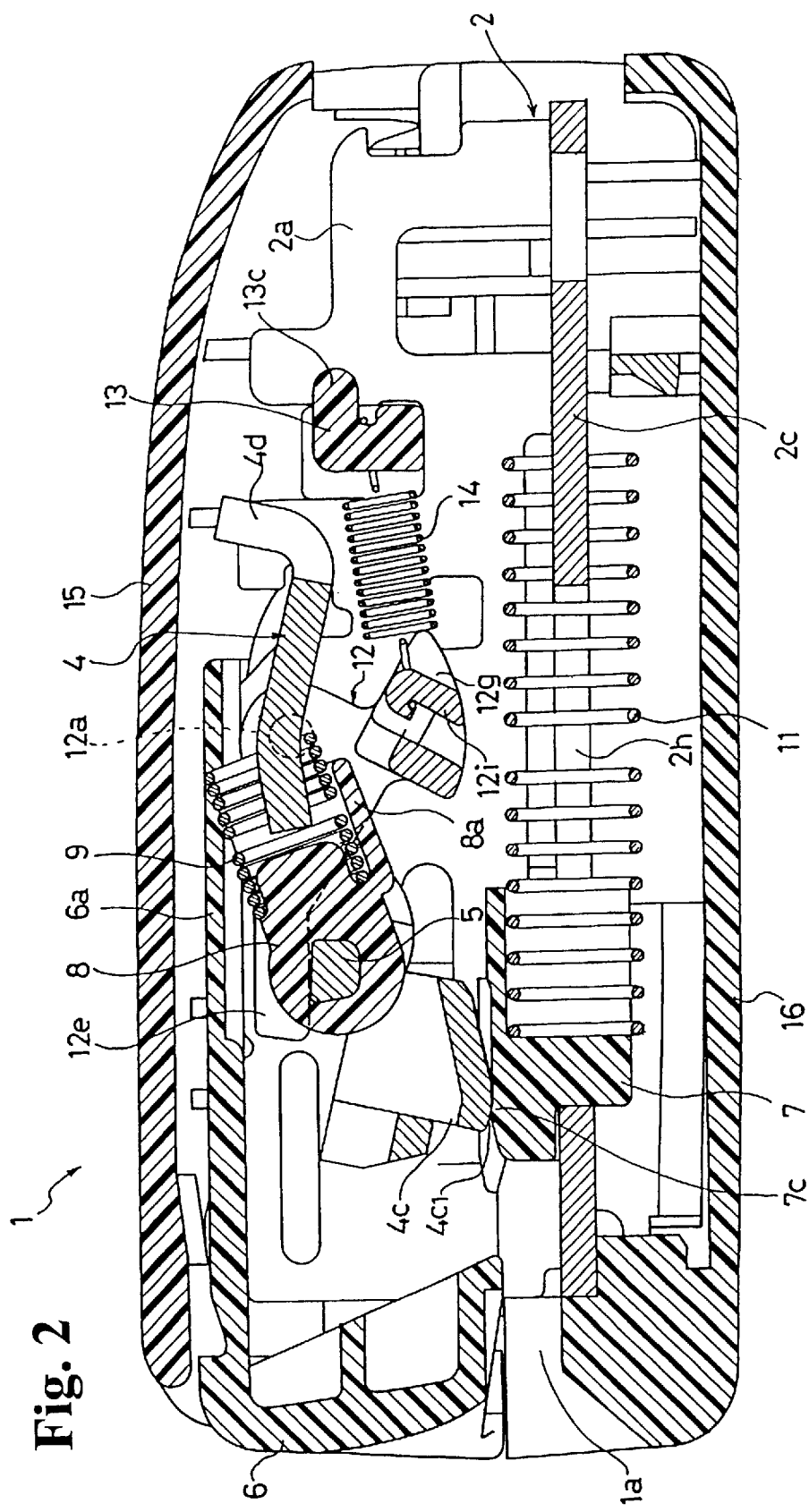
FIG. 2 is a sectional view showing the buckle of this embodiment in an unlatched state in which a tongue is not engaged.
Figure 3:
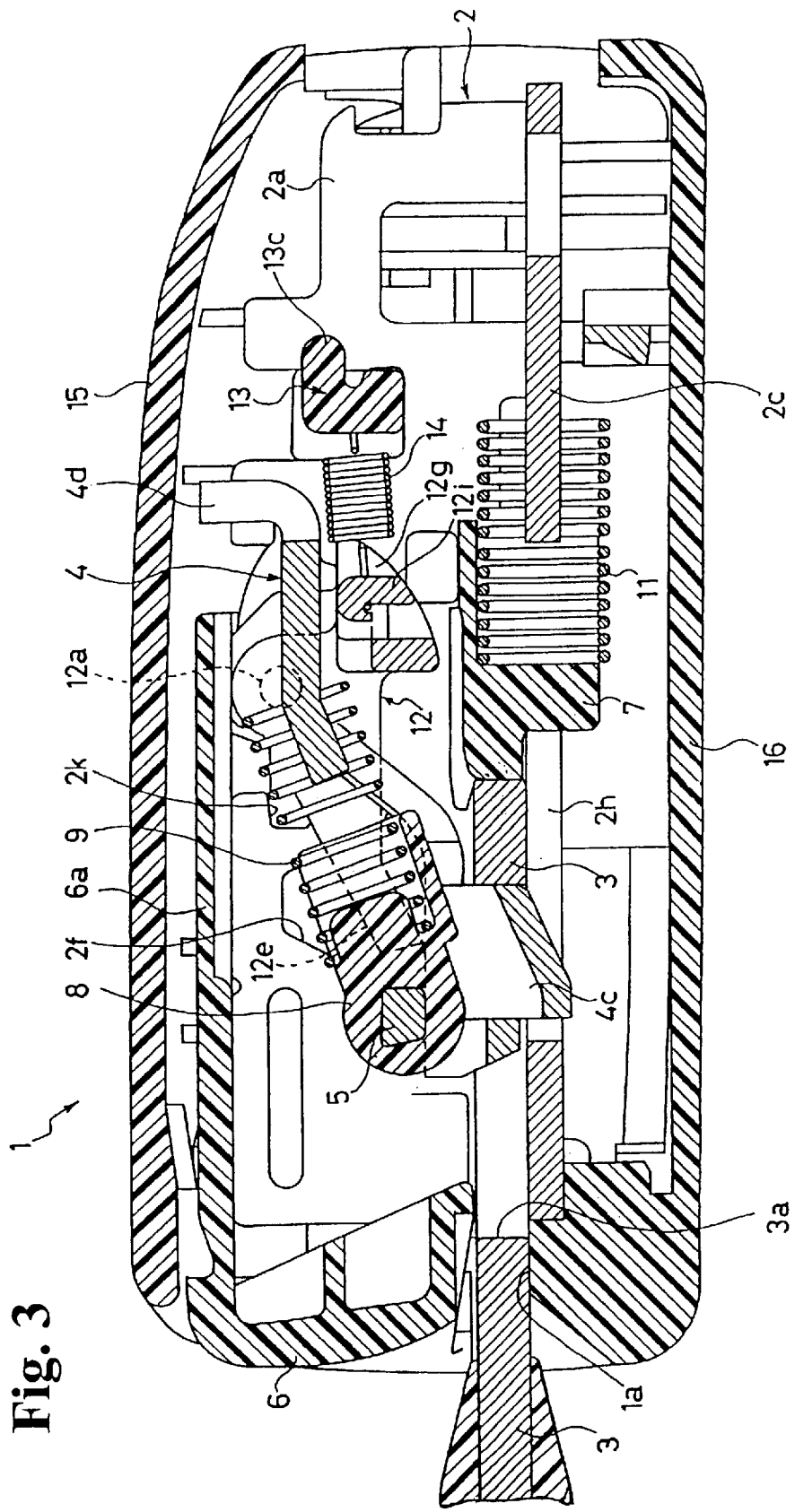
FIG. 3 is a sectional view showing the buckle of this embodiment in a latched state in which the tongue is engaged.
Figure 4:
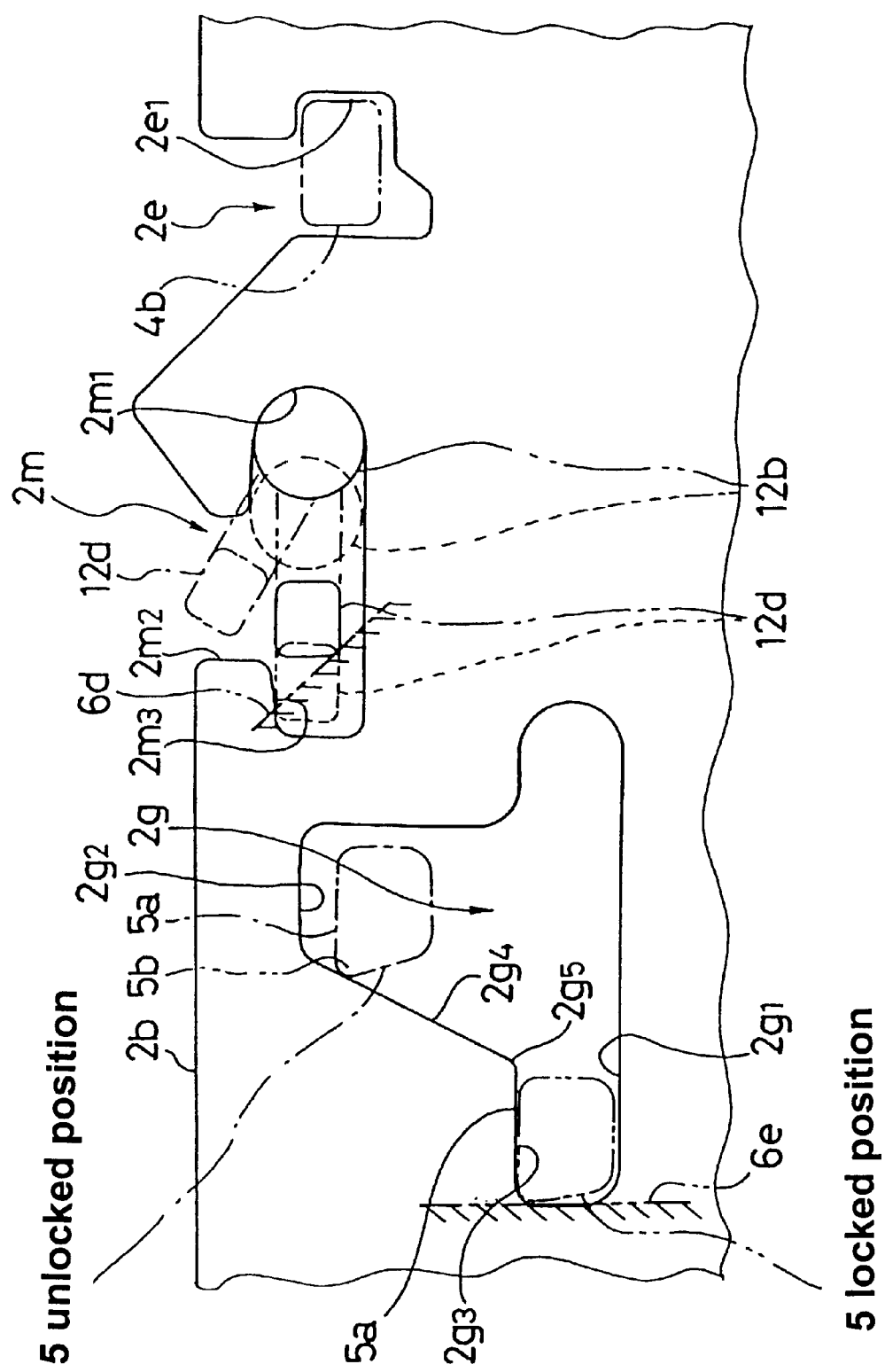
FIG. 4 is a view showing a guide hole, a supporting groove, and a guide groove formed in a side wall of a base of the buckle of this embodiment.

FIG. 1 is an exploded perspective view showing an embodiment of the buckle of the present invention, FIG. 2 is a sectional view showing the buckle of this embodiment in the unlatched state in which a tongue is not engaged, FIG. 3 is a sectional view showing the buckle of this embodiment in the latched state in which the tongue is engaged, and FIG. 4 is a view showing a guide hole, a supporting groove, and a guide groove formed in a side wall of a base of the buckle of this embodiment. It should be noted that the terms "right" and "left" used in the following description represent the right and the left in the drawings.

As shown in FIG. 1 through FIG. 4, the buckle 1 of this embodiment comprises a base 2 which is a U-shaped frame having side walls 2a, 2b and a bottom 2c; a latch member 4 which is pivotally supported by the side walls 2a, 2b of the base 2 and can engage a tongue 3; a lock pin 5 for preventing the latch member 4 from moving in an unlatching direction when the tongue 3 is engaged with the latch member 4; an operational button 6 disposed to the side walls 2a, 2b of the base 2 in such a manner that the operational button 6 can move in a longitudinal direction of the base 2; an ejector 7 disposed on the bottom 2c of the base 2 in such a manner that the ejector 7 can slide in the longitudinal direction of the base 2 and can bias the tongue in such a direction as to be released from the buckle 1; a slider 8 having a lock-pin holding portion 8a for holding the lock pin 5; a slider spring 9 which is compressed and disposed between the slider 8 and the latch member 4 and always biases the slider 8 to press the lock pin 5 toward the latch member 4; a button spring 10 always biasing the operational button 6; an ejector spring 11 always biasing the ejector 7; an inertia lever member 12 which is pivotally supported by the side walls 2a, 2b of the base 2 in such a manner that it can move in the longitudinal direction of the base 2 and which prevents the lock pin 5 from moving due to inertia to a release position where the engagement between the tongue 3 and the latch member 4 is released; a spring holder 13 supported by and fixed to the side walls 2a, 2b of the base 2; a lever spring 14 which is stretched and disposed between the inertia lever member 12 and the spring holder 13; an upper cover 15 and a lower cover 16 which are engaged with each other in such a manner that the base 2 on which the aforementioned components are assembled is covered from the top and the bottom; and a buckle switch 17.

The side walls 2a, 2b of the base 2 are provided with supporting grooves 2d, 2e for supporting shaft portions 4a, 4b of the latch member 4; an inverse T-shaped guide holes 2f, 2g for supporting and guiding both end portions 5a, 5b of the lock pin 5; guide rails 2h in which guide grooves 7a, 7b of the ejector 7 are slidably fitted and which guide the ejector 7 in the longitudinal direction (two guide rails are disposed symmetrically relative to the longitudinal axis, but only one is shown), guide grooves 2k, 2m which support shaft portions 12a, 12b of the inertia lever member 12 in such a manner that the inertia lever member 12 can pivot and move in the longitudinal direction and which receive pressed portions 12c, 12d for returning the inertia lever member 12 from its operative position to its non-operative position by the depression of the operational button 6, receiving portions 2n, 2o in which mounting portions 13a, 13b of the spring holder 13 are fitted in such a manner as to allow the removal of the spring holder 13, and guide portions 2p, 2q for guiding the tongue 3 during the insertion of the tongue 3 into the buckle 1. A spring supporting portion 2i is formed in one side wall 2b for supporting one end of the button spring 10, and a spring supporting portion 2j is formed for supporting one end of the ejector spring 11.

The configurations of the supporting groove 2e, the inverse T-shaped guide hole 2g, and the guide groove 2m formed in the side wall 2b are shown in FIG. 4. The supporting groove 2e has a shaft supporting portion 2e1 for pivotally supporting the shaft portion 4b of the latch member 4. The inverse T-shaped guide hole 2g comprises a longitudinal hole portion 2g1 extending in the longitudinal direction and a vertical hole portion 2g2 extending upwardly from a middle portion of the longitudinal hole portion 2g1. An upper portion of a left end of the longitudinal hole portion 2g1 is a lock-pin holding portion 2g3 for holding the upper side of the lock pin 5 to prevent the upward movement of the lock pin 5 when the lock pin 5 is in its locked position (shown by a two-dot chain line in FIG. 4). A left end edge of the vertical hole portion 2g2 is a guiding portion 2g4 for guiding the lock pin 5 when the lock pin 5 moves from the unlocked position (shown by a chain line in FIG. 4) from the locked position or moves reversely. The guiding portion 2g4 is formed to be an inclined surface extending upwardly with a rightward angle from the longitudinal hole portion 2g1. The intersection between the lock-pin holding portion 2g3 and guiding portion 2g4 is a rounded portion 2g5 formed in an arc shape, a radius of which is preferably made as small as possible.

The guide groove 2m comprises a shaft supporting portion 2m1 for supporting the shaft portions 12b of the inertia lever member 12, an opening 2m2 through which the pressed portion 12d of the inertia lever member 12 can pass as shown by a chain line in FIG. 4 when the inertia lever member 12 pivots between the non-operative position and the operative position, and a pivot preventing portion 2m3 for preventing the pivotal movement of the inertia lever member 12 into the non-operative position by the contact with the pressed portion 12d as shown by a two-dot chain line in FIG. 4 when the inertia lever member 12 moves due to inertia.

The supporting groove 2d, guide hole 2f, and guide groove 2k formed in the side wall 2a are not shown in FIG. 4 but are formed in the same configurations as the supporting groove 2e, the guide hole 2g, and the guide groove 2m. Though the components of these members are not shown in FIG. 4, these members are designated as a longitudinal hole portion 2f1, a vertical hole portion 2f2, a lock-pin holding portion 2f3, a guiding portion 2f4, and a rounded portion 2f5 in the following description.

The side wall 2b is further provided with a buckle switch mounting hole 2r to which a buckle switch 17 is mounted as described later.

The latch member 4 comprises a joggle portion 4c which can engage the tongue 3, pressed portions 4d, 4e which can be pressed by an end opposite to the operational end of the operational button 6 to move the latch member 4 in a releasing direction when the tongue 3 and the buckle 1 are disengaged by the operational button 6, and a spring supporting portion 4f for supporting one end of the slider spring 9. The latch member 4 takes a non-latched position where the tongue 3 is not engaged with the latch member 4, and a latched position where the tongue 3 is engaged with the latch member 4. The latch member 4 can pivot about the shaft portions 4a, 4b between the non-latched position and the latched position.

The lock pin 5 is disposed so that the lower end thereof always contacts the top surface of the latch member 4. The lock pin 5 takes the aforementioned locked position, to be set by the spring force of the slider spring 9, where the lock pin 5 is positioned in the longitudinal hole portions 2f1, 2g1 in the inverted T-shaped guide holes 2f, 2g to lock the latch member 4 in the latched state while the latch member 4 engages the tongue 3, and the aforementioned unlatched position, to be set by the operating force of the operational button 6, where the lock pin 5 is positioned in the vertical hole portions 2f2, 2g2 in the inverted T-shaped guide holes 2f, 2g to release the engagement of the latch member 4 from the tongue 3, wherein the unlocked position is located on the right side of the locked position. The lock pin 5 has a section formed in a substantially rectangular shape or a substantially inverse trapezoidal shape having a shorter bottom side. During the movement of the lock pin 5, the end portions 5a, 5b of the lock pin 5 always touch the guiding portions 2f4, 2g4 or the rounded portions 2f5, 2g5 of the guide holes 2f, 2g, and the upper surfaces of the end portions 5a, 5b touch the holding portions 2f3, 2g3. The corners of the end portions 5a, 5b are rounded.

The end portions 5a, 5b of the lock pin 5 project outside from both the guide holes 2f, 2g for a predetermined amount when suspended by the guide holes 2f, 2g of the side walls 2a, 2b. As will be described later, a latch detector 17f of the buckle switch 17 contacts the end portion 5a of the lock pin 5 projecting through the side wall 2b such that the latch detector 17f works with the operation of the lock pin 5.

The operational button 6 comprises a plane portion 6a extending in the longitudinal direction and in the width direction, side walls 6b (one side wall is not shown in FIG. 1 and is formed in the same manner as the side wall 6b. For convenience of explanation, numeral 6b designates both side walls.) formed perpendicularly to the plane portion 6a and thus disposed on both side edges of the plane portion 6a, and a spring supporting portion 6c disposed at a position shifted to one side from the center along the longitudinal direction for supporting the other end of the button spring 10. In this case, as shown in FIG. 2 and FIG. 3, the plane portion 6a and the side walls 6b of the operational button 6 form together an inverted U-shaped cross-section and extend to the right side of the shaft portions 12a, 12b of the inertia lever member 12. Disposed inside the side walls 6b of the operational button 6 are inertia lever operating portions, not shown in FIG. 1 through FIG. 3, comprising inclined surfaces which press the pressed portions 12c, 12d of the inertia lever member 12 in such a manner as to move the inertia lever member 12 from the operative position to the inoperative position (schematically shown in FIG. 4 as an inertia lever operating portion 6d). Also disposed inside the side walls 6b of the operational button 6 are lock pin operating portions, also not shown in FIG. 1 through FIG. 3, comprising vertical surfaces which press the both end portions of the lock pin 5 to move the lock pin 5 from the locked position to the unlocked position (schematically shown in FIG. 4 as a lock pin operating portion 6e).

In this embodiment, as the operational button 6 is operated to move to the right for releasing the state in which the tongue 3 and the buckle 1 are engaged, the inertia lever operating portions 6d contact the pressed portions 12c, 12d of the inertia lever member 12 to press up the pressed portions 12c, 12d toward the inoperative position of the inertia lever member 12, and then, the lock pin operating portions 6e contact the lock pin 5 to move the lock pin 5 toward its unlocked position.

The ejector 7 includes a protrusion 7c which is disposed along the longitudinal center thereof and comes to point-contact with the joggle portion 4c of the latch member 4, and a spring supporting portion 7d for supporting the other end of the ejector spring 11.

The slider 8 includes a spring supporting portion 8b for supporting the other end of the slider spring 9.

The inertia lever member 12 composes a shock-proof system for preventing the movement of the lock pin 5 and the operational button 6 into their release positions due to inertia while the tongue 3 and the buckle 1 are engaged. The inertia lever member 12 comprises levers 12e, 12f, mass bodies 12g, 12h which are structured to have center of gravity G substantially perpendicular to the extension direction of the levers 12e, 12f, and a spring supporting portion 12i for supporting one end of the lever spring 14. In this case, the mass of the mass bodies 12g, 12h is designed in such a manner that a moment about the shaft portions 12a, 12b produced by the inertia force acting on the center of gravity G of the mass bodies 12g, 12h due to inertia is larger than a moment around the shaft portions 12a, 12b produced by the force of the inertia lever operating portions 6d for pressing up the pressed portions 12c, 12d of the inertia lever member 12 toward the inoperative position of the inertia lever member 12 due to the inertia movement of the operational button 6 in the releasing direction.

The spring holder 13 includes a spring supporting portion 13c for supporting the other end of the lever spring 14.

The buckle switch 17 comprises, as shown in FIGS. 5(a) and 5(b), a switch casing 17a, a sliding member 17b slidably accommodated in the switch casing 17a, a magnet (MG) 17c moving together with the sliding member 17b, an IC Hall element 17d attached to the switch casing 17a to confront the locus of the magnet 17c, an arm 17e connected to the sliding member 17b, a latch detector 17f disposed on the end of the arm 17e, a switch spring 17g composed of a coil spring which always biases the sliding member 17b in such a direction that the arm 17e projects from the switch casing 17a, and a wire 17h which electrically connects the IC Hall element 17d to a central processing unit (hereinafter, referred to as "CPU") not shown which controls the operation of a display device, such as an indication lamp not shown.

The magnet 17c comprises a left-side magnet member 17c1 and a right-side magnet member 17c2, with a boundary corresponding to a middle portion in the right and left direction (longitudinal direction) of the buckle switch 17, to produce respective magnetic fields having different directions. When an electric current flows and magnetic field is applied in a direction perpendicular to the current, the IC Hall element 17d produces electromotive force in a direction perpendicular to the electric current and the magnetic field.

The switch spring 17g biases the arm 17e to securely slide in the projecting direction while the buckle 1 is shifted from the unlatched state to the latched state, thereby stabilizing and securing the detection of the latched state of the buckle 1 by the buckle switch 17 of a non-contact type composed of the magnet 17c and the IC Hall element 17d. The buckle switch 17 shown in FIGS. 5(a) and 5(b) is in the state where the arm 17e fully projects.

It should be noted that the switch casing 17a correspond to a fixed member of the present invention, and the sliding member 17b, the arm member 17e and the latch detector 17f corresponds to a movable member for latch detection, of the present invention.

Figure 6A:
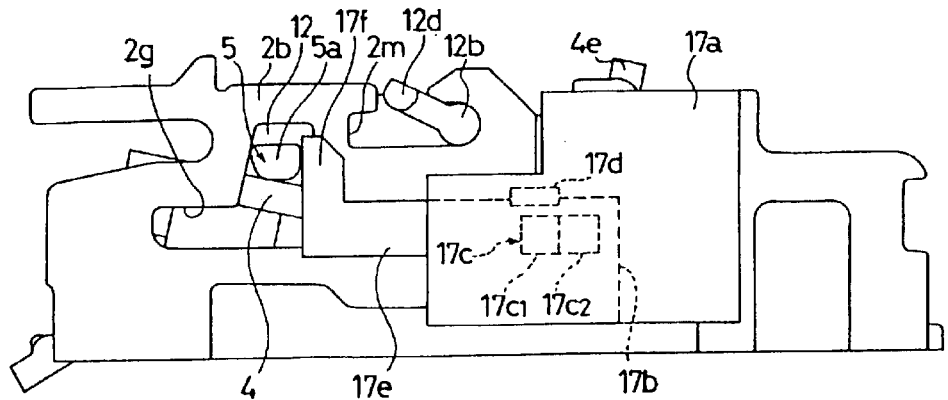
Figure 6B:
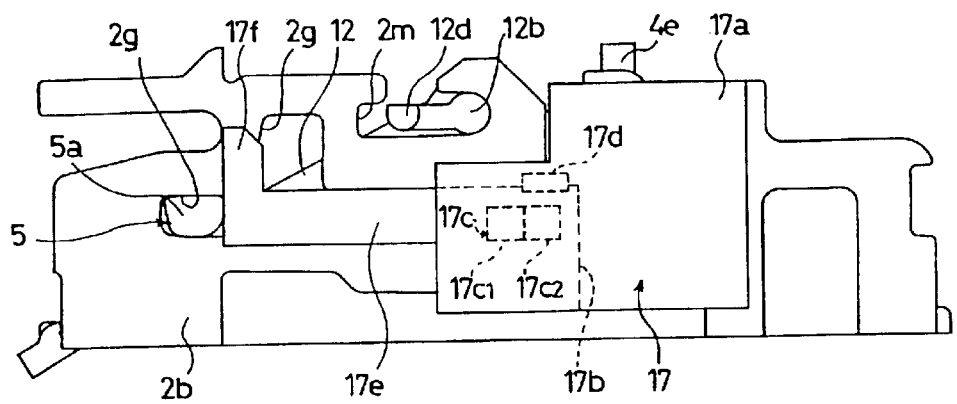
Figure 6C:
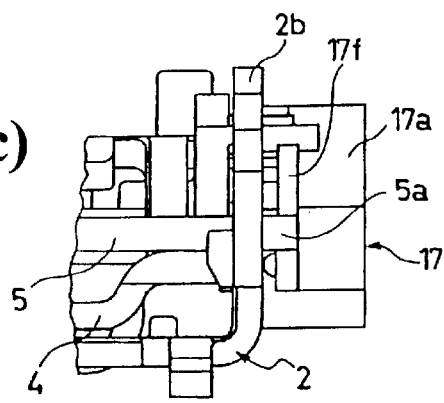

The buckle switch 17 structured as mentioned above is mounted to a buckle switch mounting hole 2r of the side wall 2b as shown in FIG. 6(a) through FIG. 6(c). In the state where the buckle switch 17 is mounted, the latch detector 17f contacts the end portion 5a projecting outside from the side wall 2b. In the state shown in FIG. 6(a), the latch detector 17f is in contact with the lock pin 5 in the unlocked position and the arm 17e is in the state fully retracted in the switch casing 17a. At this point, the magnet 17c is positioned such that the left-side magnet member 17c1 confronts the IC Hall element 17d. In this state, the IC Hall element 17d receives a magnetic field from the left-side magnet member 17c1 so as to generate an electromotive force in a direction corresponding to the direction of the magnetic field of the left-side magnet member 17c1. The electromotive force is transmitted to the CPU through the conduct 17h.

When the lock pin 5 is in the locked position as shown in FIG. 6(b), the arm 17e is in the state fully projected from the switch casing 17a. At this point, the magnet 17c is positioned such that the right-side magnet member 17c2 confronts the IC Hall element 17d as shown in FIG. 5(b). In this state, the IC Hall element 17d receives a magnetic field from the right-side magnet member 17c2 so as to generate an electromotive force in a direction corresponding to the direction of the magnetic field of the right-side magnet member 17c2. The electromotive force is transmitted to the CPU through the conduct 17h in the same manner.

Though the electromotive force generated by the IC Hall element 17d is transmitted to the CPU, the direction of the magnetic field of the right-side magnet member 17c2 is different from the direction of the magnetic field of the left-side magnet member 17c1, that is, opposites to the direction of the magnetic field of the left-side magnet member 17c1. Accordingly, the directions of these electromotive forces are also opposite to each other. The CPU detects a change in the direction of the electromotive force, i.e. a change in the direction of the magnetic field of the magnet 17c, to actuate the display device so that the display device displays that the tongue 3 is securely engaged with the buckle 1.

In this manner, the magnet 17c and the IC Hall element 17d are used to detect a change in the direction of the magnetic field of the magnet 17c. By this detection, the display device can be controlled in such a manner that the display device is not operated when the lock pin 5 is in the unlocked position, i.e. when the tongue 3 is not engaged with the buckle 1, and is operated when the lock pin 5 is in the locked position, i.e. when the tongue 3 is engaged with the buckle 1. That is, in the buckle 1 of this embodiment, the magnet 17c and the IC Hall element 17d compose the buckle switch of the non-contact type utilizing Hall effect.

Though there is no illustration in any of the drawings, a known buckle pretensioner is connected to the base 2 of the buckle 1. The buckle pretensioner is actuated in case of emergency, such as a vehicle collision, to rapidly pull the base 2 to the right in the drawings, whereby the seat belt can quickly restrain a vehicle occupant.

Hereinafter, description will be made as regard to the action of the buckle 1 of this embodiment structured as mentioned above for engaging the tongue 3 and the action of the buckle switch.

FIGS. 7(a) and 7(b) are views for explaining the action of the buckle of this embodiment for engaging the tongue and the action for preventing the inertia release while the buckle and the tongue are engaged, wherein FIG. 7(a) is a view showing the unlatched state in which the tongue is not engaged with the buckle and FIG. 7(b) is a view showing the latched state in which the tongue is engaged with the buckle. For convenience of explanation, sections are irregularly shown and illustrations of components not directly related to the following description are partially omitted.

In the unlatched state of the buckle 1 in which the tongue 3 is not engaged, as shown in FIG. 2 and FIG. 7(a), the ejector 7 is set in its left-most position by the spring force of the ejector spring 11. In this left-most position of the ejector 7, the ejector 7 presses up the joggle portion 4c of the latch member 4 so that the bottom 4c1 of the joggle portion 4c of the latch member 4 is in point-contact with the protrusion 7c formed on the top of the ejector 7. In this state, the latch member 4 is out of the path for the tongue 3, that is, in the unlatched position where it does not engage the tongue 3.

At this point, the lock pin 5 is in contact with the upper surface of the latch member 4 and is thus lifted by the latch member 4 so that the lock pin 5 is set at the unlocked position in the vertical hole portions 2f2, 2g2 of the inverted T-shaped holes 2f, 2g. In this unlatched state of the buckle 1, since the levers 12e, 12f of the inertia lever member 12 are mounted on the lock pin 5 and the lock pin 5 is lifted to be located at the unlocked position, the levers 12e, 12f of the inertia lever member 12 are set in the non-operative position as shown by dotted lines of FIG. 7(a). Because of the spring force of the lever spring 14 acting rightward, the inertia lever member 12 is in the state in which the shaft portion 12b thereof is in contact with the 2m1.

When the lock pin 5 is in the unlocked position, as shown in FIG. 6(a), the arm 17e of the buckle switch 17 is in the state fully retracted in the switch casing 17a and the left-side magnet member 17c1 of the magnet 17c confronts the IC Hall element 17d as mentioned above.

As the tongue 3 is inserted into the buckle 1 through a tongue-insertion opening 1a formed in the left end of the buckle 1 in the unlatched state of the buckle 1 shown in FIG. 2 and FIG. 7(a), the right end of the tongue 3 collides with the left end of the ejector 7 and then presses the ejector 7 rightward. Accordingly, the ejector 7 moves to the right so as to compress the ejector spring 11 according to the insertion of the tongue. By the movement of the ejector 7, the joggle portion 4c mounted on the protrusion 7c of the ejector 7 comes off the ejector 7. Since the lock pin 5 is pressed down by the spring force of the slider spring 9 via the slider 8 and the lock pin 5 presses in turn the joggle portion 4c of the latch member 4, the latch member 4 pivots about the shaft portions 4a, 4b in the counter-clockwise direction in the drawings. Therefore, the joggle portion 4c of the latch member 4 enters the path for the tongue 3 and is inserted into an engaging hole 3a of the tongue 3 so that the latch member 4 comes to the latched position. As the operating force for insertion applied to the tongue 3 is cancelled, the ejector 7 presses the right end of the tongue 3 by the spring force of the ejector spring 11 whereby the right end portion of the engaging hole 3a of the tongue 3 is engaged with the joggle portion 4c. As a result of this, the tongue 3 is engaged with the buckle 1, that is, the buckle 1 comes to the latched state as shown in FIG. 3 and FIG. 7(b).

During this, the lock pin 5 is guided by the guiding portions 2f4, 2g4, i.e. the inclined surfaces, to move down in the vertical hole portions 2f2, 2g2 to enter into the longitudinal hole portions 2f1, 2g1 and move to the left, i.e. into the locked position. In the locked position of the lock pin 5, since the upper side of the lock pin 5 is held by the lock-pin holding portions 2f3, 2g3, the upward movement of the lock pin 5 is prevented. Therefore, the lock pin 5 keeps the latch member 4 in the latched position, thereby preventing the latch member 4 from coming off the engaging hole 3a of the tongue 3 and thus securely keeping the engagement between the tongue 3 and the buckle 1.

In this latched state of the buckle 1 in which the tongue 3 is engaged, since the spring supporting portion 12i of the inertia lever member 12 is pulled by the spring force of the lever spring 14, the inertia lever member 12 pivots about the shaft portions 12a, 12b supported by the shaft supporting portions 2k1, 2m1, in the counter-clockwise direction. As shown in FIG. 7(b), therefore, the ends of the levers 12e, 12f enter the path of the lock pin 5 moving into the unlocked position, and the pressed portions 12c, 12d are in such positions capable of passing through the openings 2k2, 2m2 so that the inertia lever member 12 is in the operative position. In the operative position of the inertia lever member 12, even when the lock pin 5 tends to move to the unlocked position, the lock pin 5 contacts the levers 12e, 12f, thereby preventing the movement of the lock pin 5 to the unlocked position.

During the movement of the lock pin 5 from the unlocked position to the locked position, the arm 17e slides to project from the switch casing 17a by the biasing force of the switch spring 17g, and the latch detector 17f follows the movement of the lock pin 5 in the longitudinal direction. In the state where the lock pin 5 is in the locked position, the arm 17e of the buckle switch 17 is in the state fully projected from the switch casing 17a as shown in FIG. 6(b) and the right-side magnet member 17c2 of the magnet 17c confronts the IC Hall element 17d. Then, the direction of magnetic field of the magnet 17c is changed in reverse and the direction of the electromotive force generated by the IC Hall element 17d is changed in reverse. Therefore, the display device detects the change in the direction of the electromotive force of the IC Hall element 17d, i.e. the change in the direction of the magnetic field of the magnet 17c to activate the display device, for example, turn on a lump. In this manner, while the buckle 1 shifts from the unlatched state to the latched state, the switch spring 17g securely projects the arm 17e whereby the buckle switch 17 of the non-contact type composed of the magnet 17c and the IC Hall element 17d can securely operate to detect the latched state.

In this manner, the engagement between the tongue 3 and the buckle 1 can be securely conducted and can be securely prevented from releasing, and it can be displayed that the tongue 3 and the buckle 1 are securely engaged.

To release the engagement between the tongue 3 and the buckle 1, as the operational button 6 is pressed to the right, the operational button 6 moves to the right and, as described above, the inertia lever operating portions 6d of the operational button 6 press up the pressed portions 12c, 12d of the inertia lever member 12 toward the inoperative position, so that the inertia lever member 12 pivots about the shaft portions 12a, 12b in the clockwise direction in such a manner that the pressed portions 12c, 12d pass through the openings 2k2, 2m2. Accordingly, the ends of the levers 12e, 12f move upwardly above the path of the lock pin 5 for moving in the longitudinal direction.

As the operational button 6 further moves to the right from this state, the lock pin operating portions 6e move the lock pin 5 to the right. When the lock pin 5 arrives at a position allowing the shifting of the lock pin 5 into the vertical hole portions 2f2, 2g2, the lock pin 5 is no longer held by the lock-pin holding portion 2f3, 2g3, so that the latch member 4 is allowed to pivot about the shaft portions 4a, 4b in the clockwise direction. At this point, the lock pin 5 is positioned just below the levers 12e, 12f. Since the lock pin 5 is not held by the lock-pin holding portion 2f3, 2g3 and the ejector 7 is biased in the releasing direction by the spring force of the ejector spring 11, the ejector 7 springily presses up the latch member 4 so that the latch member 4 pivots about the shaft portions 4a, 4b in the clockwise direction. As a result, the joggle portion 4c comes off, the engaging hole 3a of the tongue 3 and the tongue 3 is pushed out to the left. At this point, the lock pin 5 is lifted up by the latch member 4 according to the pivot movement of the latch member 4 in the clockwise direction and thus enters into the vertical hole portions 2f2, 2g2. In addition, the lock pin 5 presses up the levers 12e, 12f so that the inertia lever member 12 pivots about the shaft portion 12a, 12b in the clockwise direction.

Then, the bottom 4c1 of the joggle portion 4c of the latch member 4 is mounted on the protrusion 7c of the ejector 7. Finally, the ejector 7 comes to the left-most position, the latch member 4 comes to the unlatched position, the lock pin 5 comes to the unlocked position, and the inertia lever member 12 comes to the non-operative position, so that the buckle 1 comes to the unlatched state in which the tongue 3 is released as shown in FIG. 2 and FIG. 7(a).

By the movement of the lock pin 5 into the unlocked position, the arm 17e of the buckle switch 17 comes to the state fully retracted in the switch casing 17a again and the left-side magnet member 17c1 confronts the IC Hall element 17d as shown in FIG. 6(a), whereby the direction of the magnetic field of the magnet 17c is changed to the initial direction again. Therefore, the CPU senses the change in the direction of the magnetic field and thus stops the activation of the display device.

The CPU which senses the change in the direction of the magnetic field and controls the activation of the display device can control other devices of the seat belt device, such as a retractor and other devices installed in the vehicle, which should be operated depending on the operation of the seat belt device when the change in the direction of magnetic field is sensed.

According to the buckle switch 17 of this embodiment, since the buckle switch is a non-contact type, there is no possibility of contact failure due to abrasion of the contacts. This means that the buckle switch 17 of this embodiment has significantly improved in durability as compared to switches of a contact type, such as a substrate type switch and a micro switch.

In addition, since this buckle switch 17 of the non-contact type utilizes Hall effect by using the magnet 17c and the IC Hall element 17d, the buckle switch 17 is not generally affected by an installation error, liquid, such as water and juice, foreign materials, such as dusts, and rust due to liquid as compared to the buckle switch composed of a light emitting diode and a light receiving element disclosed in the aforementioned publication. The buckle switch can be further securely operated.

Though the buckle switch 17 detects the engagement between the tongue 3 and the buckle 1 by following the movement of the lock pin 5 from the unlocked position to the locked position and can be switched according to this detection in the aforementioned embodiment, the present invention is not limited thereto. The buckle switch 17 may detect the engagement between the tongue 3 and the buckle 1 by following the movement of one of the components of the buckle 1 which moves from a position when it is not latched to a position when it is latched, for example the movement of the latch member 4 from the unlatched position to the latched position, the movement of the ejector 7 from the position when it is not latched to a position when it is latched, and may be switched by this detection. In this case, the magnet 17c may be attached to the movable component, and the IC Hall element 17d may be attached to the switch casing 17a.

Though the magnet 17c is composed of two magnet members having different directions of magnetic fields in the aforementioned embodiment, the magnet 17c may be composed of one magnet member having a single direction of magnetic field. In addition, the magnet 17c may be attached to the fixed component, such as the switch casing 17a, and the IC Hall element 17d may be attached to the movable component side, such as the lock pin 5. The magnet 17c or the IC Hall element 17d attached to the movable component side may be directly attached to the movable component.

As apparent from the above description, according to the buckle of the present invention, the switch is switched in a non-contact manner by Hall effect by using the magnet and the Hall element, thereby preventing the occurrence of contact failure due to abrasion of contacts and thus significantly improving the durability as compared to the switch of a contact type, such as a substrate type switch and a micro switch.

In addition, as compared to the buckle switch composed of a catoptric device disclosed in the aforementioned publication, the buckle switch 17 is not substantially affected by an installation error, liquid, such as water and juice, foreign materials, such as dusts, and rust due to liquid. The buckle switch can be further securely operated.

Particularly, according to the fourth aspect of the invention, the biasing means biases the movable member to securely slide in the projecting direction while the buckle 1 is shifted from the unlatched state to the latched state, thereby stabilizing and securing the detecting operation of the buckle switch.

While the invention is explained with reference to the specific embodiments of the invention, the explanation is illustrative, and the invention is limited only by the appended claims.

What is claimed is:

1. A buckle to be engageable with a tongue, comprising:

a base having side walls;

an ejector disposed on the base to be movable in a longitudinal direction of the base according to an insertion of the tongue, said ejector allowing the tongue to come off the buckle when an engagement between the tongue and the buckle is released;

a latch member pivotally supported on the side walls to pivot between an unlatched position and a latched position, said latch member being biased toward the latched position, and when the tongue is inserted into a predetermined position, pivoting to the latched position where the tongue is engaged;

an operating member disposed on the base for releasing an engagement between the tongue and the latch member in a latched state;

a lock member disposed between the side walls so as to move between an unlocked position and a locked position, said lock member being set in the locked position where the latch member is held in the latched position when the tongue engages the latch member, and being moved to the unlocked position by the operating member where an engagement of the tongue with the latch member can be cancelled; and a non-contact buckle switch to be switched by detecting a movement of one of the ejector, latch member and lock member, said buckle switch including a magnet, a Hall element situated near the magnet for generating an electromotive force by a magnetic field of the magnet, a switch casing attached to the base, and a movable member for latch detection disposed in the switch casing to be movable following a movement of one of the ejector, latch member and lock member, one of said magnet and said Hall element being attached to one of the movable member and the switch casing, and the other of said magnet and said Hall element being attached the other of the movable member and the switch casing.

2. A buckle as claimed in claim 1, wherein said magnet comprises two magnet members having different directions of magnetic fields, one of said two magnet members confronting the Hall element in the unlatched state where the tongue does not engage the buckle, the other of the two magnet members confronting the Hall element in the latched state where the tongue engages the buckle.

3. A buckle as claimed in claim 1, wherein said buckle switch further includes biasing means disposed in the switch casing for biasing the movable member toward an outside of the switch casing when the buckle is shifted from the unlatched state to the latched state.

4. A buckle as claimed in claim 3, wherein said movable member includes a contact portion always contacting said one of the ejector, latch member and lock member.

* * * * *